United States Patent [19]
Shin

[11] Patent Number: 5,682,083
[45] Date of Patent: Oct. 28, 1997

[54] SPOT REMOVING CIRCUIT FOR A CRT WITH GRID CONTROL MEANS

[75] Inventor: Hyun-Gook Shin, Incheon, Rep. of Korea

[73] Assignee: Daewoo Electronics Co., Ltd., Rep. of Korea

[21] Appl. No.: 580,615

[22] Filed: Dec. 29, 1995

[30] Foreign Application Priority Data

Dec. 29, 1994 [KR] Rep. of Korea ............... 94-38696

[51] Int. Cl.$^6$ ............... H01J 29/52; H04N 3/24
[52] U.S. Cl. ............... 315/1; 315/381; 315/384; 315/386; 348/377
[58] Field of Search ............... 315/1, 380, 381, 315/384, 386, 411, 30; 348/377, 378, 380

[56] References Cited

U.S. PATENT DOCUMENTS

| | | | |
|---|---|---|---|
| 4,056,758 | 11/1977 | Schaas | 315/381 |
| 4,217,525 | 8/1980 | Nakamura et al. | 315/381 |
| 5,084,657 | 1/1992 | Ueda | 315/381 |

FOREIGN PATENT DOCUMENTS 0090702  10/1983  European Pat. Off. ............ 315/384

Primary Examiner—Benny Lee
Assistant Examiner—Justin P. Bettendorf
Attorney, Agent, or Firm—Beveridge, DeGrandi, Weilacher & Young, LLP

[57] ABSTRACT

A spot removing circuit for a display device is disclosed. The spot removing circuit comprises a rectifying and smoothing portion for rectifying and smoothing the voltage outputted from a flyback transformer, a capacitor for charging a voltage supplied from a power supply and discharging the charged voltage when the power supply switch is turned off, and a grid control portion for supplying a grid terminal with the voltage outputted from the rectifying and smoothing portion when a power supply switch is turned on and for supplying the grid terminal with the voltage discharged from the capacitor plus the output voltage from the rectifying and smoothing portion when the power supply switch is turned off so that a spot can be prevented from appearing on a display screen when the power supply switch of the display device is turned off.

8 Claims, 1 Drawing Sheet

SPOT REMOVING CIRCUIT FOR A CRT WITH GRID CONTROL MEANS

BACKGROUND OF THE INVENTION

1. Field of the Invention

The present invention relates to a spot removing circuit for a cathode ray tube (hereinafter referred to as CRT) in a display device, and more particularly, to a spot removing circuit for CRT preventing a spot phenomenon from occurring in CRT by lowering a grid voltage when a power supply switch is turned off.

2. Description of the Prior Art

Generally, in the display device using the CRT, when the power supply switch is turned off, the voltage supplied to CRT is not immediately removed. Thus a video signal is scanned to a point on the mask of the CRT and the spot appears on the display screen. Such the spot burns the damages a fluorescent screen of the CRT and the life span of the CRT becomes shorter. From this basis, eliminating the spot from the CRT screen is indispensable.

To solve a problem described as above, a variety of spot removing circuits have been developed and used. Referring to FIG. 1, a conventional spot removing circuit will be explained. Firstly, it is to describe an operation of the invention in case that the power supply switch is turned on.

As shown in FIG. 1, a rectifying and smoothing portion 10 for rectifying and smoothing a voltage outputted from flyback transformer FBT is connected to an output terminal of flyback transformer FBT. Flyback transformer FBT supplies rectifying and smoothing portion 10 with a negative voltage. More particularly, the output terminal of flyback transformer FBT is connected to an anode terminal of a diode D1 of rectifying and smoothing portion 10, and a cathode terminal of diode D1 is connected to an input terminal of a capacitor C1. An output terminal of capacitor C1 is connected to a ground.

The negative voltage from flyback transformer FBT is rectified by diode D1. The output voltage from diode D1 is supplied to capacitor C1 and is smoothed therein.

An output terminal of rectifying and smoothing portion 10 is connected to a spot killer portion 20. The output terminal of capacitor C1 of rectifying and smoothing portion 10 is connected to the input terminal of capacitor C2 of spot killer portion 20. The output terminal of capacitor C2 is connected to the input terminal of resistor R1. Thus, the voltage outputted from rectifying and smoothing portion 10 is supplied to capacitor C2 to be charged. After capacitor C2 has fully been charged, the voltage is supplied to the input terminal of resistor R1.

Grid terminal G1 of the CRT is connected to the output terminal of resistor R1. Accordingly, the voltage outputted from resistor R1 is supplied to grid terminal G1.

Then, the output voltage from flyback transformer FBT is about −160 V through −200 V and the voltage charged in capacitor C2 is about −100 V. As a result, the voltage of about −60 V is supplied to grid terminal G1.

Meanwhile, when the power supply switch is turned off, capacitor C2 is reverse biased and the charged voltage therein of about −100 V is discharged. Thus, the voltage that is to be supplied to grid terminal C1 is the same as the sum of the grid voltage and the discharged voltage, i.e., about −160 V.

By lowering the voltage supplied to grid terminal G1, the brightness of the display screen becomes dark completely. In such a manner the spot is prevented from appearing on the display screen.

However, in the conventional spot removing circuit described in the above, because of capacitance of capacitor C2, it takes conciderable time for capacitor C2 to discharge the charged voltage. Therefore, after the power supply switch is turned off, the voltage applied to grid terminal G1 is not immediately reduced to zero, thus the spot still appears on the display screen for a moment.

SUMMARY OF THE INVENTION

Therefore, it is an object of the present invention to provide the spot removing circuit capable of removing the spot on the display screen by reducing the grid voltage rapidly when the power supply switch is turned off.

To accomplish the object of the present invention, there is provided the spot removing circuit for CRT comprising:

a rectifying and smoothing portion 100 connected to an output terminal of the flyback transformer FBT for rectifying and smoothing the voltage outputted from the flyback transformer FBT;

a charging/discharging portion 300 for charging the voltage supplied from the power supply and for discharging the charged voltage when the power supply switch is turned off; and a grid control portion 200 for supplying the voltage outputted from rectifying and smoothing portion 100 to grid terminal G1 when the power supply switch is turned on and for passing through the voltage outputted from rectifying and smoothing portion 100 added with the discharged voltage of charging/discharging portion 300 to lower the grid voltage to negative when the power supply switch is turned off.

According to the spot removing circuit constructed as above, when the power supply switch is turned on, a predetermined voltage V1 is charged in charging/discharging portion 300 and the voltage outputted from rectifying and smoothing portion 100 is applied to grid terminal G1 through grid control portion 200. When the power supply switch is turned off, charging/discharging portion 300 is reverse biased and the voltage charged in charging/discharging portion 300 is discharged. The voltage made by the discharged voltage plus the output voltage from rectifying and smoothing portion 100 is supplied to grid terminal G1 through grid control portion 200. Consequently, the grid terminal is supplied the lower negative voltage. By doing this, the spot appearing on the display screen when the power supply switch is turned off can be removed owing to the lowering of the brightness of the display screen.

BRIEF DESCRIPTION OF THE DRAWINGS

The object and other merits of the present invention are now described in detail by way of an example with reference to the accompanying drawings in which.

DETAILED DESCRIPTION OF THE PREFERRED EMBODIMENT

A spot removing circuit for CRT according to an embodiment of the present invention is described with reference to the attached drawings.

Figure 1:
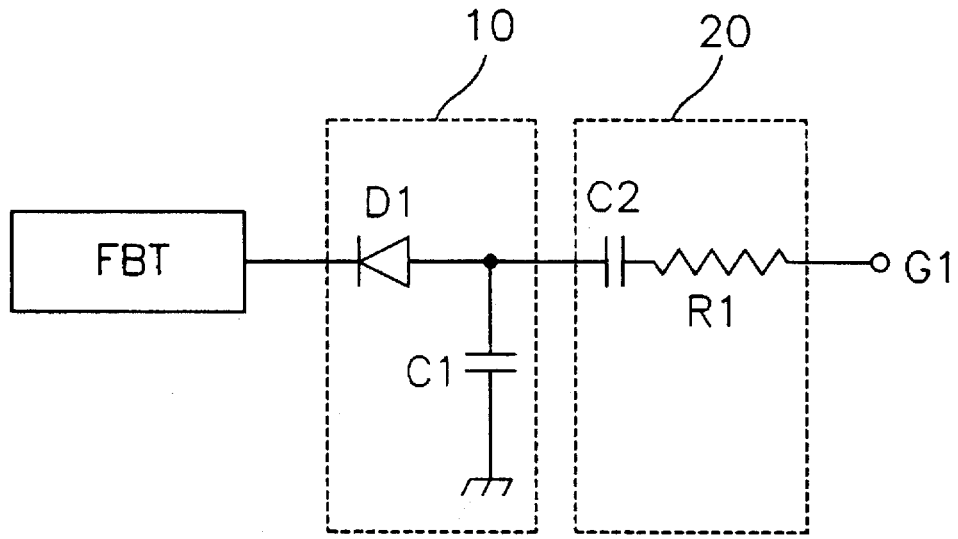
FIG. 1 is a circuit diagram of a conventional spot removing circuit for CRT.
Figure 2:
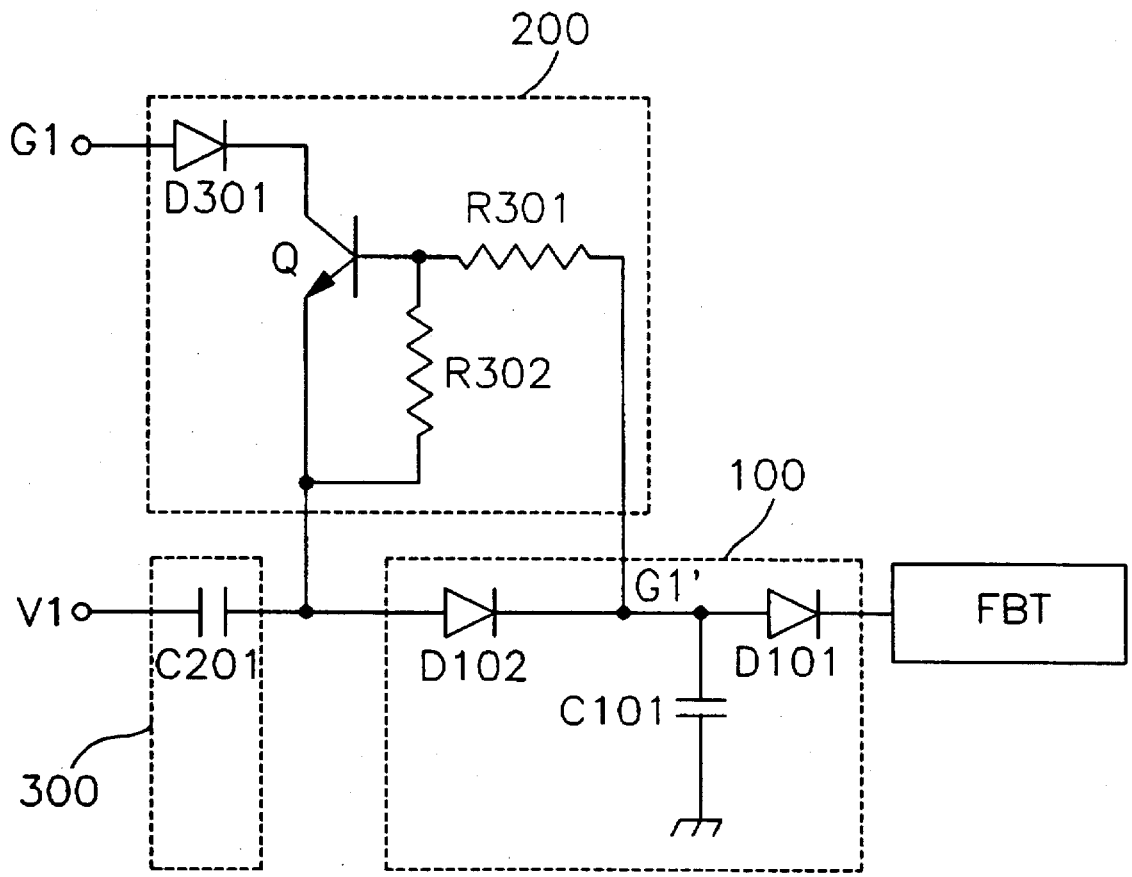
FIG. 2 is a circuit diagram of a spot removing circuit for CRT according to the present invention.

FIG. 2 illustrates the spot removing circuit for CRT according to the present invention. In FIG. 2, numeral 100 denotes a rectifying and smoothing portion to rectify and smooth a negative voltage outputted from a flyback transformer FBT. Numeral 300 is a charging/discharging portion to charge when a power supply switch is turned on and to discharge when the power supply switch is turned off. Numeral 200 is a grid control portion to apply the negative voltage of flyback transformer FBT to grid terminal G1 when the power supply switch is turned on and to pass the discharged voltage of a capacitor C201 added with the output voltage from rectifying and smoothing portion 100 to apply the conciderable negative voltage into grid terminal G1 when the power supply switch is turned off.

According to the present invention constructed as above, when the power supply switch is turned on, the predetermined voltage V1 is applied to the input terminal of capacitor C201, and the output terminal of capacitor C201 is connected to the cathode terminal of diode D102 of rectifying and smoothing portion 100 and a emitter terminal of a transistor Q of grid control portion 200. Predetermined voltage V1 is supplied and charged in capacitor C201.

The output terminal of flyback transformer FBT is connected to the anode terminal of first diode D101 of rectifying and smoothing portion 100. The cathode terminal of diode D101 is connected to the input terminal of capacitor C101. The output terminal of capacitor C101 is connected to a ground.

Negative voltage in flyback transformer FBT is rectified by diode D101 of rectifying and smoothing portion 100. The voltage outputted from diode D101 is smoothed in capacitor C101.

The input terminal of capacitor C101 of rectifying and smoothing portion 100 is connected to the anode terminal of diode D102 and the input terminal of resistor R301 of grid control portion 200. The output terminal of resistor R301 is connected to the base terminal of transistor Q and input terminal of resistor R302. The output terminal of resistor R302 of grid control portion 200 is connected to the cathode terminal of diode D102 and the emitter terminal of transistor Q.

The voltage outputted from capacitor C101 is supplied to the emitter terminal of transistor Q through diode D102 and divided by resistors R301 and R302 of grid control portion 200. The voltage outputted from resistor R301 is applied to the base terminal of transistor Q and the output voltage from resistor R302 is applied to the emitter terminal of transistor Q. At this time, between the base terminal and emitter terminal of transistor Q, voltages are different from each other so transistor Q is turned on.

The collector terminal of transistor Q of grid control portion 200 is connected to the anode terminal of diode D301 and the cathode terminal of diode D301 is connected to grid terminal G1 of CRT.

When transistor Q is turned on, the voltage outputted from diode D102 is supplied to the anode terminal of diode D301 through transistor Q of grid control portion 200, and after being outputted to the cathode terminal the voltage is applied to grid terminal G1.

Then, when the power supply switch is turned off, the voltage V1 charged in capacitor C201 is reverse biased and the voltage charged in capacitor C201 is discharged. At this time, owing to the characteristics of the components in circuit, the voltage is not instantaneously discharged although the power supply switch is turned off. Then transistor Q of grid control portion 200 remains in turned on state. In general, the voltage is gradually reduced. Therefore, the voltage made by the output voltage from rectifying and smoothing portion 100 plus the discharged voltage of capacitor C201 is applied to grid terminal G1 via transistor Q of grid control portion 200 and diode D301.

Transistor Q of grid control portion 200 used in the embodiment described in the foregoing is an npn transistor.

As described thus far, in the spot removing circuit for CRT according to the present invention, grid control portion 200 supplies grid terminal G1 with voltage G1' which is obtained by rectifying and smoothing the voltage outputted from flyback transformer FBT when the power supply switch is turned off. When the power supply switch is turned off, grid control portion 200 applies the output voltage from rectifying and smoothing portion 100 plus the discharged voltage of capacitor C201 to grid terminal C1 so that the grid voltage is lowered to the considerable negative voltage.

As such, the problem of the conventional spot removing circuit, in which the spot appearance on the display screen due to the discharging time of the capacitor is not completely removed since the voltage applied to grid terminal G1 is not immediately reduced, is improved. Specifically, the spot removing circuit immediately applies considerably low negative voltage to grid terminal G1 using transistor Q with a high switching speed so that the brightness of the display screen is lowered and the spot appearance can be removed from the screen.

According to the spot removing circuit for CRT constructed as above, a problem of the conventional spot removing circuit in which the sufficient discharge cannot be made immediately because of the volume of the capacitor is eliminated. The spot appearance is prevented by the above description when the power supply switch is turned off, then the great negative voltage of (V−G1') is immediately applied to grid terminal G1 while discharging the charged voltage in capacitor C201. Therefore, the present invention can prevent the spot appearance from burning the display screen and damaging the cathode ray tube. Thus, the life span of CRT can be prolonged so the more reliable display screen with CRT can be obtained.

In the above, the present invention is described in detail by using the preferred embodiment, but the invention is not limited in the above embodiment. It should be obvious to people skilled in the conventional art that modifications can be made to the invention as described above without departing from the spirit or the scope of the invention. However the invention is limited by accompanying claims as below.

What is claimed is:

1. A spot removing circuit for a cathode ray tube comprising:

a rectifying and smoothing means for rectifying and smoothing a voltage outputted from a flyback transformer;

a charging/discharging means for charging a voltage supplied from a power source and for discharging the charged voltage when a power supply switch is turned off; and a grid control means for supplying the voltage outputted from said rectifying and smoothing means to a grid terminal when the power supply switch is turned on and for passing through the output voltage from said rectifying and smoothing added with the voltage discharged from said charging/discharging means to lower the grid voltage to negative when the power supply switch is turned off, wherein said grid control means comprises:

a transistor and two resistors, an emitter terminal of said transistor being connected to an output terminal of said charging/discharging means and an output terminal of said rectifying and smoothing means, a base terminal of said transistor being connected to an output terminal of said rectifying and smoothing means via the first resistor to receive the voltage from the flyback transformer and to the emitter terminal via the second resistor to obtain the voltage difference between the base terminal and the emitter terminal, and a collector terminal of said transistor being connected to the grid terminal for applying the voltage to the grid terminal.

2. The circuit as claimed in claim 1, wherein said rectifying and smoothing means further comprises a diode for blocking a discharged voltage in said charging/discharging means not to be applied to said rectifying and smoothing means when the power supply switch is turned off.

3. The circuit as claimed in claim 1, wherein said transistor is an npn transistor.

4. The circuit as claimed in claim 1, wherein said grid control means further comprises a diode for supplying the grid terminal of the cathode ray tube with the voltage outputted from said rectifying and smoothing means during the normal operation, and for preventing the voltage applied to the grid terminal of the cathode ray tube from passing through the transistor when the power supply switch is turned off.

5. The circuit as claimed in claim 1, wherein said charging/discharging means is a capacitor.

6. The circuit as claimed in claim 1, wherein said rectifying and smoothing means comprises:

a rectifying means for rectifying the voltage outputted from the flyback transformer; and a smoothing means for smoothing ripple from the voltage rectified by said rectifying means.

7. The circuit as claimed in claim 6, wherein said rectifying means is a diode.

8. The circuit as claimed in claim 6, wherein said smoothing means is a capacitor.

* * * * *